Patented June 8, 1937

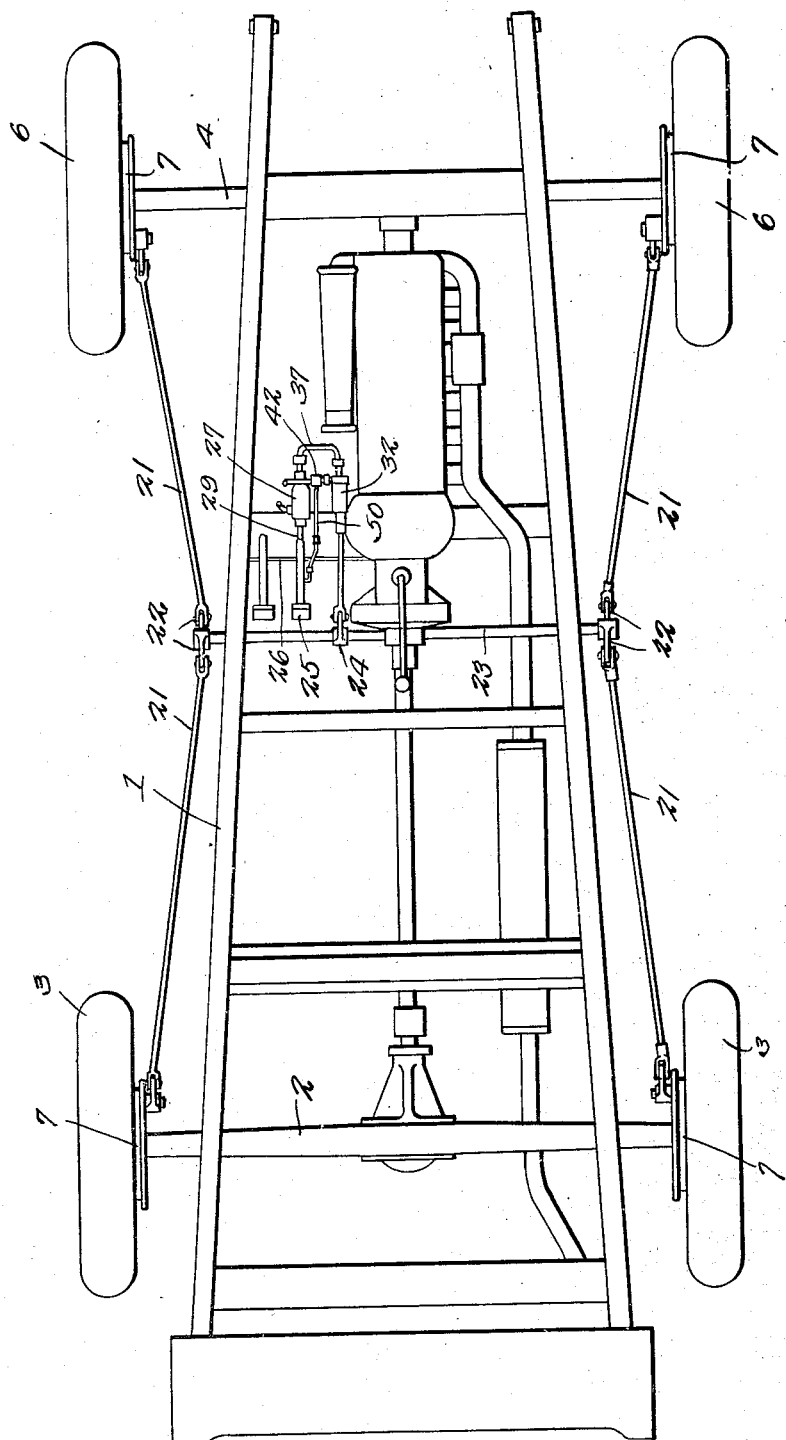

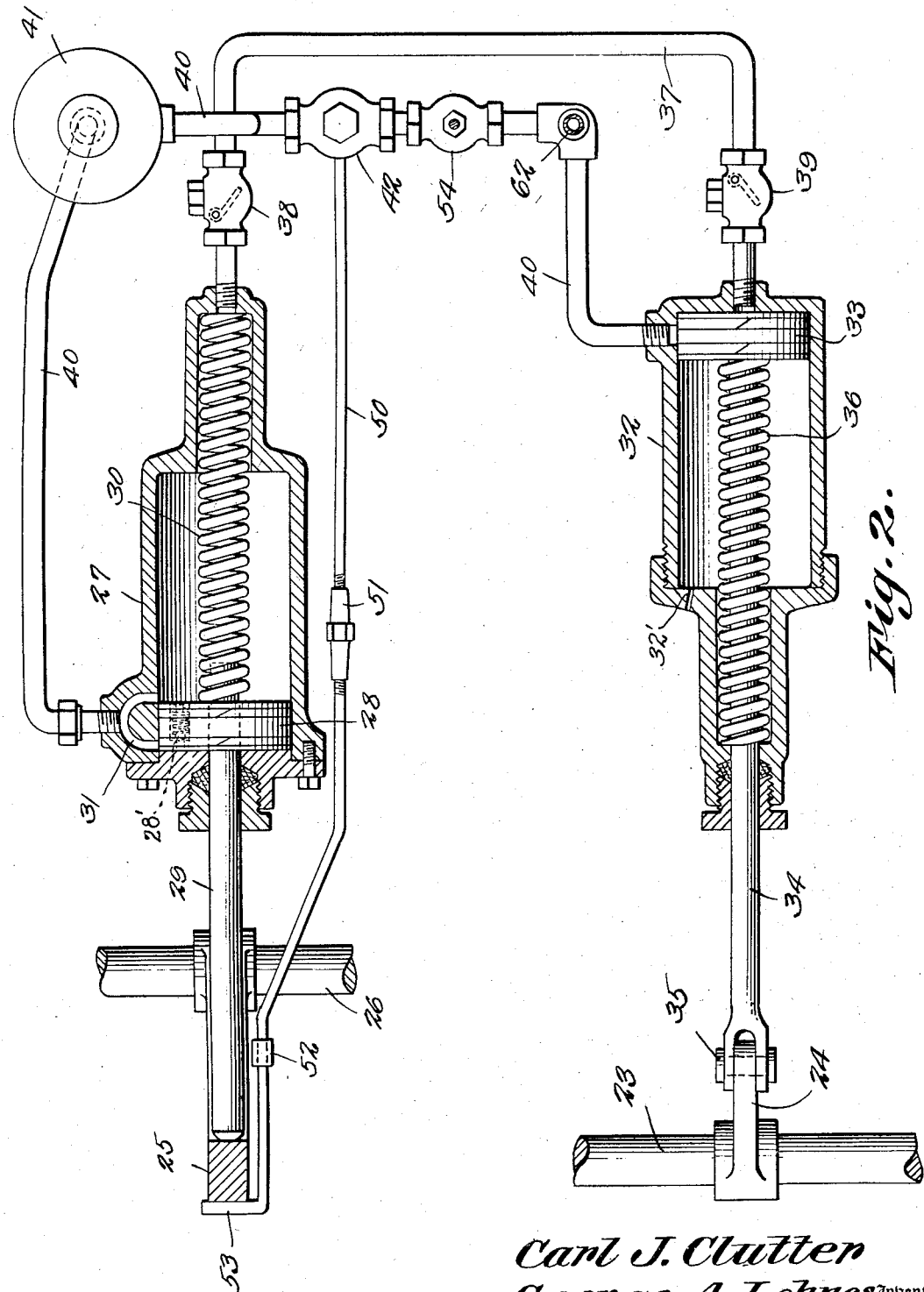

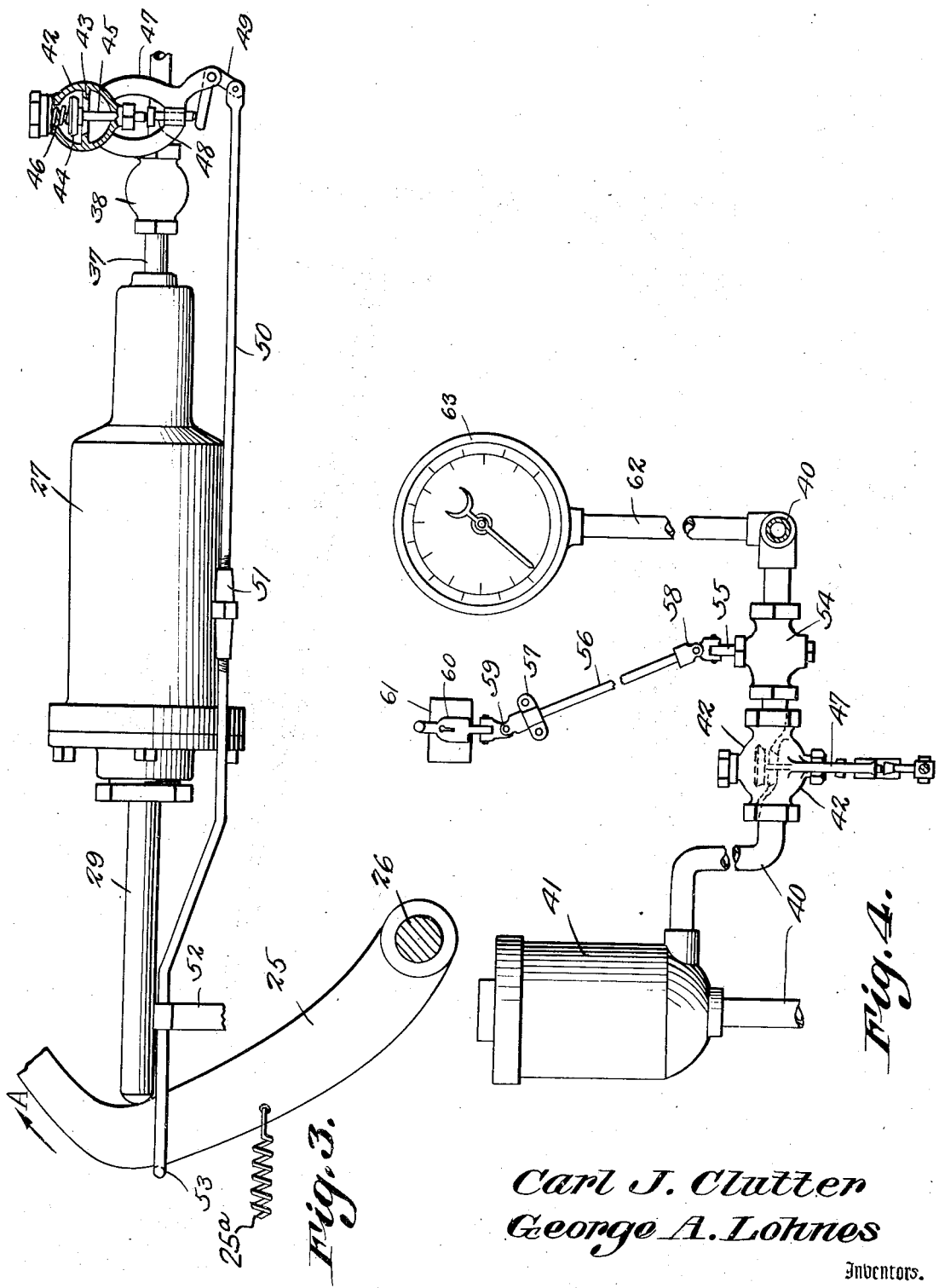

2,083,430

UNITED STATES PATENT OFFICE 2,083,430

BRAKE FOR AUTOS AND TRUCKS

Carl J. Clutter, Normal, and George A. Lohnes, Bloomington, Ill.

Application January 22, 1934, Serial No. 707,804

3 Claims. (Cl. 188—152)

One object of this invention is to provide a novel means whereby a mechanical brake can be operated by a hydraulic mechanism under the control of an operator. Another object of the invention is to provide novel means whereby the brakes may be held set and locked, with the brakes under pressure, it being possible for the owner of the car, only, or some person having a key or the like, to operate the lock and release the brakes.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, and more or less diagrammatically, the frame of a vehicle, whereon the device forming the subject matter of this application has been mounted;

Fig. 2 is a horizontal section showing the cylinders, some parts being in plan;

Fig. 3 is an elevation of the pressure-producing cylinder, some parts being in section;

Fig. 4 is a transverse section looking toward the forward portion of the vehicle, most parts being in elevation.

In Fig. 1 there is shown a vehicle frame 1, carrying a rear axle housing 2. The rear wheels are marked by the numeral 3. The front axle appears at 4, and carries the usual movable axle ends 5, whereon the front wheels 6 are journaled.

Mechanical brakes 7 are associated with the wheels 3 and 6, and these brakes may be of any desired construction, said brakes forming no part of the present invention and being capable of being selected from the known art.

The brakes 7 are operatively connected to the outer ends of links 21, the inner ends of the links 21 being pivoted to oppositely-projected arms 22 on a counter shaft 23, mounted to rock on the vehicle frame 1. It appears in Fig. 2 that the counter shaft 23 has an intermediate, forwardly-projecting arm 24. The brake pedal is designated by the numeral 25 and is carried by a shaft 26 mounted to rock on any accessible portion of the vehicle. The brake pedal 25 is retracted by the usual spring 25a.

In Fig. 2 there is shown a pressure-producing cylinder 27, in which operates a piston 28, carried by a rod 29, mounted to slide in the rear part of the cylinder 27. The piston 28 may be provided with a check valve 28', closing as the piston moves toward the check valve 38, hereinafter alluded to, and opening when the piston moves in an opposite direction. The rear end of the rod 29 is disposed in front of the brake pedal 25 and is adapted to be engaged thereby. A compression spring 30 is located in the cylinder 27 and cooperates with the forward end of the cylinder, and with the piston 28, to force the piston 28 rearwardly. Near to its rear end, the piston 28 has a by-pass 31 which permits the pressure fluid to escape from behind the piston, as the piston assumes the position shown in Fig. 2.

A pressure-receiving cylinder 32 is disposed parallel to the pressure-producing cylinder 27, these cylinders 27 and 32 being supported in any desired way on the framework of the vehicle. The cylinder 32 has a breather port 32'. A piston 33 is mounted to reciprocate in the cylinder 32 and is carried by a rod 34 which slides in the rear part of the cylinder 32. The rear end of the rod 34 is pivoted at 35 to the arm 24 on the counter shaft 23. A compression spring 36 is disposed in the cylinder 32, about a part of the rod 34, the spring exerting a pressure against the back part of the cylinder 32, and against the piston 33, to advance the piston into the position shown in Fig. 2.

The numeral 37 designates a first conduit having its ends connected, respectively, to the forward end of the cylinder 27 and to the forward end of the cylinder 32. A first check valve 38 is interposed in the conduit 37, and closes toward the cylinder 27. A second check valve 39 is interposed in the conduit 37 and closes away from the cylinder 32.

The numeral 40 designates a second conduit, one end of which communicates with the cylinder 32, near to the forward end of the said cylinder. The opposite end of the second conduit 40 communicates with the rear part of the cylinder 27, by way of the by-pass 31. A reservoir 41 for pressure fluid is interposed in the conduit 40.

As shown best in Figs. 3 and 4, a valve casing 42 is interposed in the conduit 40. The valve casing 42 is located between the reservoir 41 and the pressure-receiving cylinder 32. The valve casing 42 has a seat 43. A downwardly closing valve 44 cooperates with the seat 43. The valve 44 is carried by a stem 45, slidably mounted in the lower portion of the valve casing 42. A compression spring 46 is interposed between the valve 44 and the upper part of the casing 42 and tends to seat the valve. The valve casing 42 is provided with a depending hanger 47, in which a plunger 48 is mounted for reciprocation. The upper end of the plunger 48 cooperates with the stem 45 of the valve 44. The lower end of the plunger 48 is engaged by one arm of a bell crank lever 49, fulcrumed on the hanger 47. The other arm of the bell crank lever 49 is pivoted to an operating member 50, in the form of a rod. An adjusting device 51 is located in the operating rod 50, and the effective length of the rod, therefore, may be changed at will. The rear part of the rod 50 slides in a guide 52 supported in any desired way on the vehicle. At its rear end, the rod 50 has a rectangularly disposed finger 53 which, as shown in Fig. 2, is engaged behind the brake pedal 25.

A valve casing 54 is interposed in the conduit 40 and is located between the valve casing 42 and the cylinder 32. A rotary valve 55 is journaled in the valve casing 54. The rotary valve 55 is operated by means of a shaft 56, journaled in a bearing 57, mounted on the instrument board (not shown) of the vehicle, or elsewhere. A universal joint 58 connects the lower end of the shaft 56 with the valve 55. A universal joint 59 connects the upper end of the shaft 56 with a handle 60. The handle 60 is adapted to be moved toward and away from a lock 61, which may be mounted on the instrument board (not shown), and the handle 60 may be engaged and locked by the member 61.

A pipe 62 is branched off from the conduit 40, and is located between the valve casing 54 and the cylinder 32. The pipe 62 carries a pressure gauge 63.

When it is desired to apply the brakes, the brake pedal 25 is swung forwardly in the direction of the arrow A in Fig. 3. The spring 46 of Fig. 3 closes the valve 44 on the seat 43 of the valve casing 42. This prevents the pressure, created as hereinafter described, from finding its way back into the reservoir 41. As the spring 46 carries the valve 44 and its stem 45 downwardly, the plunger 48 is carried downwardly, the bell crank 49 is tilted, the operating member 50 is advanced, and the finger 53 on the operating member is caused to follow along behind the brake pedal 25, as the brake pedal is advanced.

When the brake pedal is advanced, the brake pedal, cooperating with the piston rod 29, advances the piston 28 in the cylinder 27, and the pressure fluid in the cylinder 27 is carried through the conduit 37 into the cylinder 32 causes the piston 33 to move backwardly, the rod 34 moves backwardly, and rocking movement is transmitted to the counter shaft 23 by way of the arm 24 on the counter shaft. When the counter shaft 23 thus is rocked, its arms 22 operate the links 21, and the links 21 operate the wheel brakes 7.

When the operator releases the brake pedal 25, the brake pedal swings backwardly, carrying with it the operating member or rod 50, the bell crank lever 49 is tilted on its fulcrum, the plunger 48 is raised, and the valve 44 of Fig. 3 is opened. The conduit 40 now is opened, and the pressure in the cylinder 32 can find its way into the reservoir 41, the pressure being equalized in the cylinders 27 and 32, and the brake mechanisms 7 being released.

If the operator wishes to lock the brakes 7 set, on a predetermined pressure, he advances the piston 28 in the cylinder 27 by means of the rod 29 and the pedal 25, thereby building up the desired pressure in the cylinder 32 and causing the piston 33 to move rearwardly and set the brakes. The valve 55 is rotated and closed by means of the shaft 26 and the handle 60, and the handle 60 is locked to the member 61. Since the valve 55 is closed, the pressure cannot flow through the conduit 40 to the reservoir 41 and equalize, when the pedal 25 is released, when the parts assume the position of Fig. 3, and when the valve 44 is opened. Moreover, the check valves 39 and 38 prevent any back flow from the cylinder 32 to the cylinder 27. The brakes 7 remain set until such a time as the operator releases the part 60 of Fig. 4 from the lock 61, rotates the shaft 56 and opens the valve 55, thereby permitting the pressure to escape from the cylinder 32 and release the brakes.

The brake pedal 25 is swung to the left in Fig. 3 by the usual brake pedal spring 25a. As a result, the brake pedal does not throw an added burden on the piston rod 29, as the piston rod moves to the left. The spring 30, therefore, is a means, unhindered by the pedal 25, for moving the piston 28 to the left. The spring 30 is a strong spring, but not strong enough to render its compression by an operator impossible. In view of the foregoing, and due to the presence of the check valve 28', there is no vacuum created to the right of the piston 28 of sufficient attenuation to render the device inoperative.

Having thus described the invention, what is claimed is:

1. In a device of the class described a pressure-producing cylinder, a pressure-receiving cylinder, pistons slidable in the cylinders, means under the control of an operator for actuating the piston of the pressure-producing cylinder, a first conduit connecting the cylinders, check means in the first conduit for preventing a retrograde flow from the pressure-receiving cylinder to the pressure-producing cylinder, a second conduit connecting the cylinders, a valve in the second conduit and responsive to the movement of the first-specified means to open and close the second conduit, a second valve in the second conduit, between the first-specified valve and the pressure-receiving cylinder, and under the control of an operator to close the second conduit at a time when the first-specified valve is open, and a brake mechanism connected to the piston of the pressure-receiving cylinder.

2. A device of the class described, constructed as set forth in claim 1, in combination with means under the control of an operator for locking the second valve.

3. In a device of the class described, a pressure-producing cylinder, a pressure-receiving cylinder, pistons slidable in the cylinders, a member under the control of an operator for actuating the piston of the pressure-producing cylinder, a first conduit connecting the cylinders, check means in the first conduit for preventing a retrograde flow from the pressure-receiving cylinder to the pressure-producing cylinder, a second conduit connecting the cylinders, a valve in the second conduit, means operatively connected with the valve and with said member under the control of an operator for actuating the valve, the valve constituting means for opening and closing the second conduit, a second valve in the second conduit, between the first-specified valve and the pressure-receiving cylinder and under the control of an operator to close the second conduit at a time when the first-specified valve is open, and a brake mechanism connected to the piston of the pressure-receiving cylinder.

CARL J. CLUTTER.
GEO. A. LOHNES.